United States Patent [19]

St. Pierre

[11] Patent Number: 4,493,354
[45] Date of Patent: Jan. 15, 1985

[54] TIRE CHAIN

[76] Inventor: Henry G. St. Pierre, 311 E. Mountain St., Worcester, Mass. 01606

[21] Appl. No.: 582,294

[22] Filed: Feb. 22, 1984

[51] Int. Cl.³ .................................... B60C 27/06
[52] U.S. Cl. .................. 152/242; 24/230.5 AD; 24/299; 59/90; 59/93; 152/231; 152/243
[58] Field of Search .............. 152/231, 239, 240, 241, 152/242, 243, 217, 220, 170, 171, 172, 189; 59/84, 85, 90, 93; 301/42; 24/230.5 AD, 230.5 W, 298, 299

[56] References Cited

U.S. PATENT DOCUMENTS

| | | | |
|---|---|---|---|
| 1,927,373 | 9/1933 | Powell | 152/242 |
| 2,131,713 | 9/1938 | Stahl | 152/239 X |
| 2,562,798 | 7/1951 | Kovatch et al. | 152/242 |
| 2,950,750 | 8/1960 | St. Pierre | 152/231 |
| 3,044,521 | 7/1962 | St. Pierre | 152/241 |
| 3,496,982 | 2/1970 | St. Pierre | 152/241 |

Primary Examiner—William A. Powell
Assistant Examiner—Thomas Bokan
Attorney, Agent, or Firm—Blodgett & Blodgett

[57] ABSTRACT

A tire chain comprising two-spaced parallel side chains, a plurality of cross chains joining the side chains at spaced intervals, a plurality of spaced junction links in each side chain, wherein each junction link has areas of reduced thickness and a hook element on each end of each cross chain for connecting to one of the junction links. Each hook element consists of a bight and two-spaced hooks which are transverse to the plane of the bight having free ends which overlie the bight and which are spaced from the bight a distance which is less than the thickness of the junction link and greater than the thickness of the areas of reduced thickness to permit the entry of the junction link into the hooks of the hook element.

10 Claims, 11 Drawing Figures

TIRE CHAIN

BACKGROUND OF THE INVENTION

The present invention relates generally to a tire chain having improved hooking means for securing the cross chains to the side chains.

The present invention is particularly directed to a tire chain in which each cross chain is provided with a hook element at each end and in which each hook element has two hook-shaped legs that are secured to a link in the side chain. This type of hook element is used in cases where it is desired to prevent the cross chain from twisting relative to the side chains. This feature is particularly useful for a cross chain which consists of twisted links which have sharp gripping edges on one side. The cross chain is mounted so that the gripping edges face outwardly from the tire and the double hook elements maintain the cross chain in this orientation. The cross chain must be periodically replaced due to linkage wear or breakage.

A special tool is required to open the hook-shaped legs, so that the legs can be slipped out of the link of the side chain for removing the cross chain. A new cross chain is applied by inserting the hook-shaped legs of the hook element in the link of the side chain. The special tool is used for crimping legs, so that the hook element remains in the link of the side chain. Since cross chains must be periodically replaced, the replacement procedure is quite annoying to the operator of the vehicle. The hook opening and crimping tool is quite expensive and must be carried by the operator at all times. The entire replacement operation is very time-consuming and, in the case of heavy duty chains, a great amount of force is required to separate and crimp the hooks. These and other difficulties experienced with the prior art devices have been obviated in a novel manner by the present invention.

It is, therefore, an outstanding object of the invention to provide a tire chain combination having cross chains which are attached to junction links in the side chains by means of double hook elements which can be applied and removed from the side chains without the use of special tools.

Another object of this invention is the provision of a tire chain combination in which the side chains can be applied and removed quickly, with very little physical effort and, yet, remain securely in place after they are applied.

A further object of the present invention is the provision of a tire chain combination which is simple in construction, and which is inexpensive to manufacture and use.

With these and other objects in view, as will be apparent to those skilled in the art, the invention resides in the combination of parts set forth in the specification and covered by the claims appended hereto.

SUMMARY OF THE INVENTION

In general, the invention consists of a tire chain having two spaced parallel side chains, a plurality of cross chains joining the side chains at spaced intervals, a hook element on each end of the cross chain, and a junction link in each side chain to which each hook element is connected. Each hook element consists of a bight which lies in a first plane and two hook-shaped legs which extend in planes that are transverse to the bight and have free ends which overlie the bight. Each junction link has an area of reduced thickness and the free end of each hook-shaped leg is spaced from the bight a distance which is less than the thickness of the junction link and greater than the thickness of the area of reduced thickness to permit the entry of the junction link into the hook-shaped portions of the legs between the free ends and the bight. Most specifically, each junction link comprises an elongated portion which includes the reduced areas and the reduced areas comprise a pair of spaced notches which extend transversely of the elongated portion.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
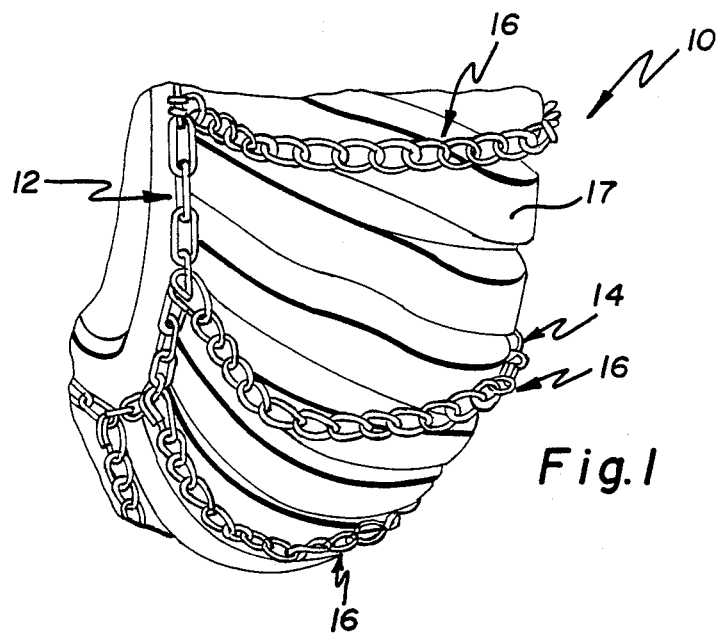
FIG. 1 is a fragmentary perspective view of a tire chain embodying the principles of the present invention shown applied to a tire.
Figure 2:
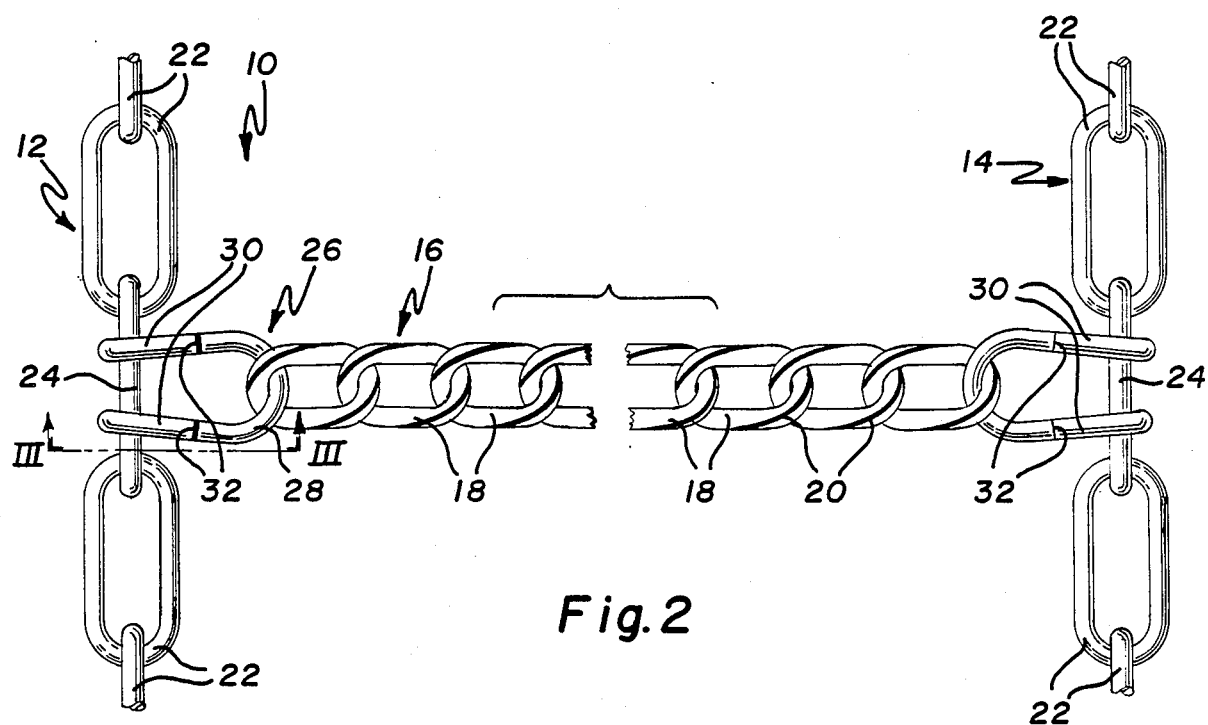
FIG. 2 is a fragmentary plan view of the tire chain.
Figure 3:
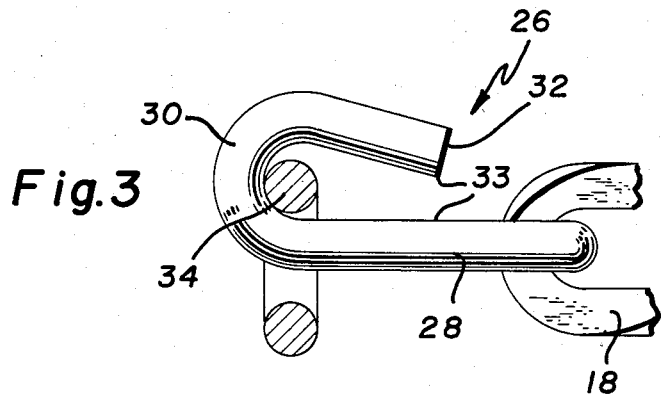
FIG. 3 is a fragmentary vertical cross-sectional view of the tire chain taken along the line III—III of FIG. 2.

Referring first to FIGS. 1-3, there is shown a tire chain embodying the principles of the present invention. The tire chain is generally indicated by the reference numeral 10 and comprises a pair of spaced parallel side chains 12 and 14 and a plurality of cross chains 16 joining the side chains 14 and 12 at spaced intervals. As shown in FIG. 1, the chain 10 is mounted on a tire, indicated by the reference numeral 17, so that the side chains 12 and 14 extend along opposite side walls of the tire, and the cross chains extend across the front of the tire from the side chain 12 to the side chain 14. Each side chain consists of a plurality of links 22 and spaced junction links 24. Each cross chain 16 consists of a plurality of twist links 18 and a hook element, generally indicated by the reference numeral 26, at each end of the cross link for attaching the cross chain to the junction links 24. Each hook element 26 consists of a bight 28 and a pair of spaced hook-shaped legs 30 which terminate in free ends 32. The hooks 30 are located in planes which are transverse to the plane of the bight 28. The ends 32 overlie the bight 28 and are spaced from the bight 28 at a distance which is less than the thickness of the junction links 24. This spacing is indicated by the reference numeral 33 in FIG. 3.

Figure 4:
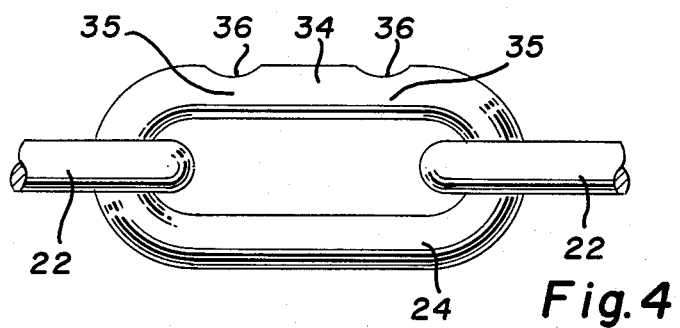
FIG. 4 is a front elevational view of a junction link.

Referring also to FIG. 4, each junction link 24 is elongated and includes an elongated portion 25 which has areas of reduced thickness indicated by the reference numeral 35. These areas of reduced thickness are formed by a pair of spaced notches 36. The areas 35 of reduced thickness have a thickness which is less than the spacing 33 between the ends 32 and the bight 28. This allows the hook elements 26 to be attached to the junction links 24 by first aligning the ends 32 with the reduced areas 35. This allows the junction link to pass through the spacing 33, so that the elongated portion 34 of the junction link lies within the bight of the hook-shaped legs 30 as shown in FIG. 3.

Figure 5:
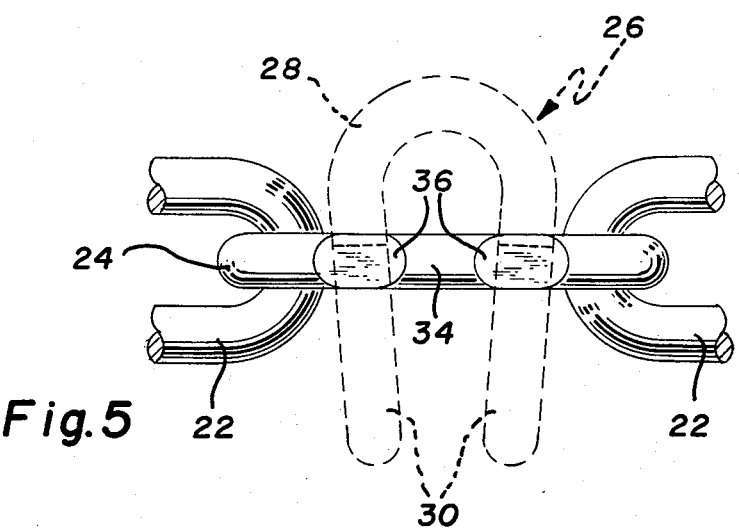
FIG. 5 is a plan view of the junction link of FIG. 4.
Figure 6:
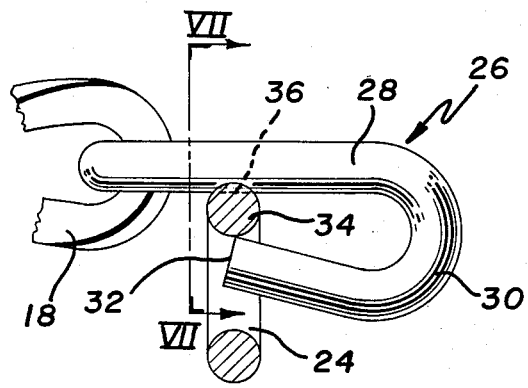
FIG. 6 is a fragmentary view showing a hook element being applied to a junction link.
Figure 7:
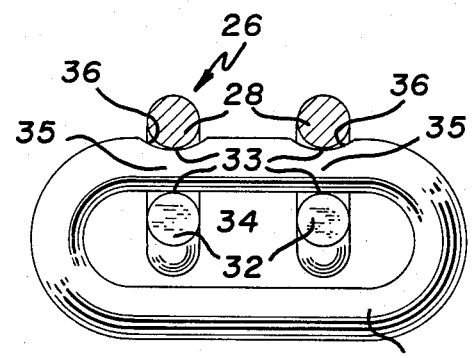
FIG. 7 is a vertical cross-sectional view taken along the line VII—VII of FIG. 6.

The manner in which the hook element 26 is applied to the junction link 24 is shown in FIGS. 6 and 7. The hook element 26 is positioned so that the legs 30 are below the elongated portion 34 of the junction link 24, with the free ends 32 facing toward the outside of the link. As shown in FIG. 7, the legs 30 are aligned with the reduced areas 35, so that the portions of the legs which form the bight 28 lie in the notches 36. Since the thickness of each reduced area 35 is less than the spacing 33, the reduced portions 35 can pass through the spaces 33, thereby allowing the elongated portion 34 to move toward the bight of the hook-shaped legs 30, so that it is located within the bight. The hook-shaped legs 30 are then rotated 180° in a clockwise direction as viewed in FIG. 6 to the position shown in FIG. 3. The hook element 26 can not be removed from the junction link 24 while it is in the position shown in FIG. 3, since the width of the bight 28 is greater than the spacing between the two links 22 which are connected to the junction link 24, as illustrated in FIG. 5. This prevents accidental unhooking of the hook element 26 from the junction link. However, when it is desired to remove the hook element 26 from the junction link 24 due to breakage or wear of the cross chain 16, the hook element is removed by reversing the procedure described above for inserting the hook in the junction link.

FIRST MODIFICATION

Figure 8:
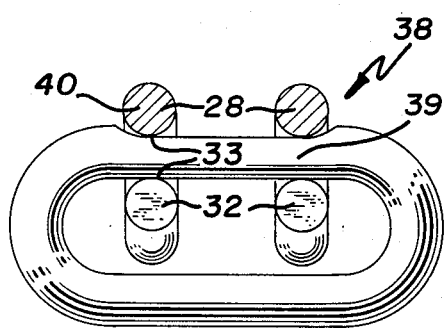
FIG. 8 is a front elevational view of a first modified junction link.

Referring to FIG. 8, there is shown a first modified junction link generally indicated by the reference numeral 38. Link 38 comprises an elongated portion 39 which has an area of reduced thickness by virtue of a wide notch 40. The width of the notch 40 is greater than the distance between the outside edges of the bight in the vicinity of the ends 32 of the hook-shaped element 26.

SECOND MODIFICATION

Figure 9:
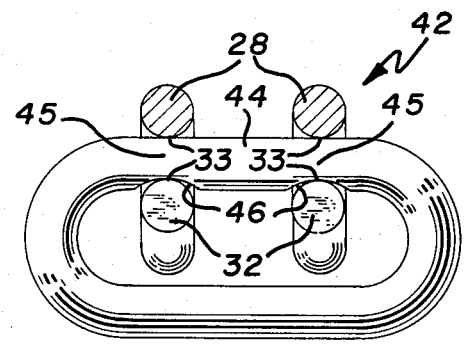
FIG. 9 is a front elevational view of a second modified junction link.

Referring to FIG. 9, there is shown a second modified junction link generally indicated by the reference numeral 42. Junction link 42 comprises an elongated portion which has reduced areas 45 which are formed by means of a pair of spaced transverse notches 46 on the interior surface of the elongated portion 44. The thickness of each reduced area 45 is less than the spaces 33.

THIRD MODIFICATION

Figure 10:
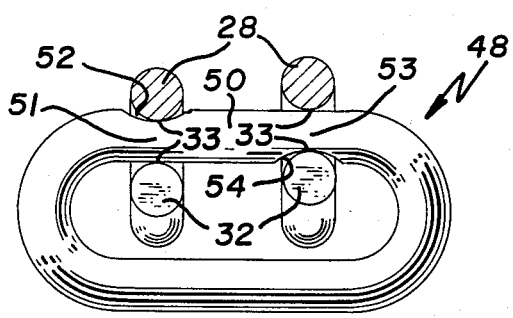
FIG. 10 is a front elevational view of a third modified junction link.

Referring to FIG. 10, there is shown a third modified junction link generally indicated by the reference numeral 48. Junction link 48 comprises an elongated portion 50 which includes areas of reduced thickness 51 and 53. Reduced area 51 is formed by a transverse notch 52 on the outer surface of the elongated portion 50 and reduced area 53 is formed by a transverse notch 54 in the inside surface of the elongated portion 50. The reduced areas 51 and 53 have a thickness which is less than the spacings 33.

FOURTH MODIFICATION

Figure 11:
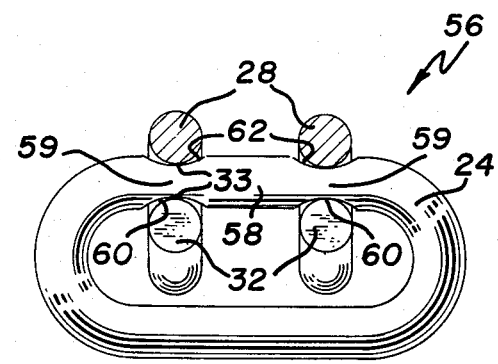
FIG. 11 is a front elevational view of a fourth modified junction link.

Referring to FIG. 11, there is shown a fourth modified junction link generally indicated by the reference numeral 56. Junction link 56 comprises an elongated portion 58 which has reduced areas 59 formed by spaced transverse notches 60 in the inside surface of the elongated portion 58 and a pair of spaced transverse notches 62 in the outer surface of the elongated portion 58. The outer notches 62 are aligned with the inner notches 60, as shown in FIG. 11 and the thickness of each reduced area 59 is less than the spacings 33 between the bight 28 and the ends 32 of the hook element 26.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Tire chain, comprising:
   (a) two spaced, parallel side chains,
   (b) a plurality of cross chains joining the side chains at spaced intervals,
   (c) a hook element on each end of each cross chain, and
   (d) a junction link in each side chain to which each hook element is connected, each hook element consisting of a bight lying in a first plane and two legs overlying the bight having free ends that are spaced from the bight a distance less than the thickness of the junction link, the junction link having two spaced parallel notches to permit the entry of the junction link into the hook element between the said free ends and the bight.

2. Tire chain, comprising:
   (a) two spaced parallel side chains,
   (b) a plurality of cross chains joining the side chains at spaced intervals,
   (c) a plurality of spaced junction links in each side chain, each junction link having areas of reduced thickness, and
   (d) a hook element on each end of each cross chain for connecting to one of said junction links, each hook element consisting of a bight lying in a first plane, and two parallel spaced hook-shaped legs which lie in planes that are transverse to said first plane and having free ends which overlie said bight, each of said free ends being spaced from said bight a distance which is less than the thickness of the junction link and greater than the thickness of said areas of reduced thickness to permit the entry of the junction link into the hook-shaped portions of said legs between said free ends and said bight.

3. Tire chain as recited in claim 2, wherein each of said junction links comprises an elongated portion which includes said reduced areas.

4. Tire chain as recited in claim 3, wherein the areas of reduced thickness comprise a pair of spaced notches which extend transversely of the elongated portion.

5. Tire chain as recited in claim 4, wherein each of said notches is curved.

6. Tire chain as recited in claim 3, wherein said reduced areas comprises a pair of transverse notches located on opposite sides of said elongated portion.

7. Tire chain as recited in claim 6, wherein each of said notches is curved.

8. Tire chain as recited in claim 2, wherein the reduction in thickness of said areas of reduced thickness is between the inside of the junction link and the outside of the junction link.

9. Tire chain as recited in claim 2, wherein the width of said bight within said first plane is greater than the distance between the portions of the side chain which are connected to the junction link.

10. Tire chain, comprising:
(a) two spaced parallel side chains,
(b) a plurality of cross chains joining the side chains at spaced intervals,
(c) a plurality of spaced junction links in each side chain, each junction link having areas of reduced thickness, and
(d) a hook element on each end of each cross chain for connecting to one of said junction links, each hook element consisting of a primary bight lying in a first plane for holding the cross chain, and two legs which are formed into secondary bights which lie in spaced parallel planes that are transverse to said first plane, each of said legs having a free end which overlies said primary bight and which is spaced from said primary bight a distance which is less than the thickness of the junction link and greater than the thickness of said areas of reduced thickness to permit the entry of the junction link into the secondary bight between said free ends and said primary bight.

* * * * *